L. Derby,
Screw Nut.
N⁰ 37,435. Patented Jan. 20, 1863.
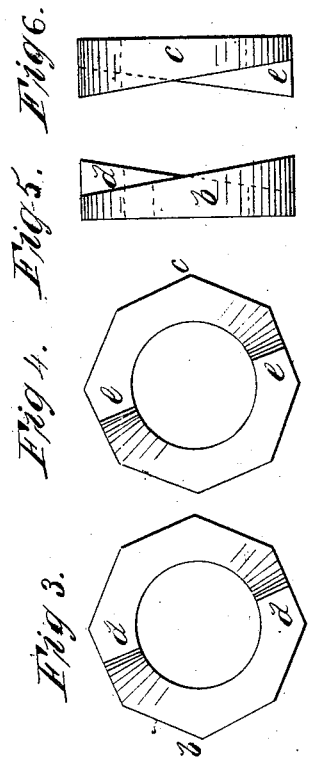
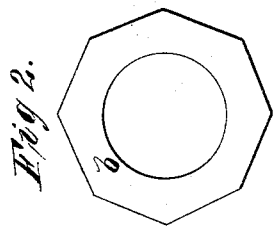
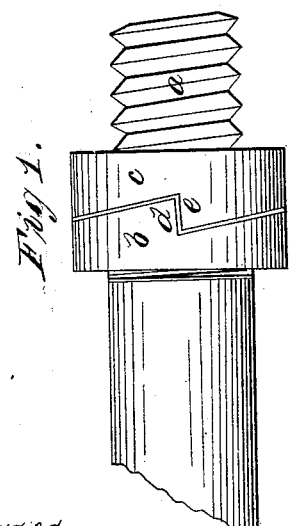
Witnesses.
C. L. Barritt
R. S. Rowley
Inventor
Lyman Derby

UNITED STATES PATENT OFFICE.

LYMAN DERBY, OF NEW YORK, N. Y.

IMPROVEMENT IN SCREW-NUTS.

Specification forming part of Letters Patent No. 37,435, dated January 20, 1863.

*To all whom it may concern:*

Be it known that I, LYMAN DERBY, of the city, county, and State of New York, have invented certain new and useful improvements in screw-nuts for the purpose of preventing their loosening from the screw-bolts; and I do hereby declare the following to be a full description of the same.

The nature of my invention consists in making the nut in two parts transversely of the axis of the nut, and forming semicircular inclined planes on their matching-faces of a pitch of a greater angle than the pitch of the screw-bolt, so that, when the nut is at the shoulder, by applying the wrench entirely to the outside half of it, and reversing its motion for half a turn or less, it causes the parts to separate in consequence of riding up the inclined planes, and thus changes the pitch of the two parts of the nut, and, as a matter of course, prevents the nut from unscrewing from off the bolt unless the parts are readjusted; but to describe my invention more particularly, I will refer to the accompanying drawings, forming a part of this specification, the same letters of reference wherever they occur referring to like parts.

Figure 1 is a plan view of the nut as applied to the screw-bolt. Fig. 2 is a face view of the nut. Figs. 3 and 4 are views of the minor faces of the two parts of the nut. Figs. 5 and 6 are edge views of the separate parts of the nut, showing the pitch of the inclined planes on their matching-faces.

Letter A is the end of a screw-bolt, having on it the nut formed of two parts, *b* and *c*. These two parts are tapped in the usual way as if it were a solid nut, and in its application to the screw in the first instance in the same manner. Upon the matching-faces of the two parts of the nut are formed semicircular inclined planes *d* and *e*. The pitch of these planes are in the same direction as the pitch of the screw-bolt, though of greater angle. The object of this is to change the pitch of the nut by separating the parts. This is accomplished in this manner: When the entire nut has been carried home, the wrench is applied entirely to the part *c*, and is carried back a few degrees. In doing this the inclined planes *d* and *e*, having a pitch of a greater angle than that of the threads of the screw, cause the parts to separate slightly, and in doing so bind against each other, at the same time changing the pitch of the threads in the nut at their points of separation, and thus, in consequence of the binding against each other and against the screw-threads, locking the nut in such a manner as to prevent it from losing its place on the screw-bolt by any jarring or vibratory motions it may be subjected to.

Having now described my invention and its operation, I will proceed to set forth what I claim and desire to secure by Letters Patent of the United States—

The construction of a screw-nut, substantially as hereinbefore described, and operating in the manner and for the purposes set forth.

LYMAN DERBY.

Witnesses:
 C. L. BARRITT,
 R. S. ROWLEY.